US012461118B2

(12) United States Patent
Takizawa et al.

(10) Patent No.: US 12,461,118 B2
(45) Date of Patent: Nov. 4, 2025

(54) AUTOMATED ANALYSIS SUPPORT ROBOT, AND AUTOMATED ANALYSIS SYSTEM (71) Applicant: Hitachi High-Tech Corporation, Tokyo (JP)

(72) Inventors: Hikaru Takizawa, Tokyo (JP); Kenta Imai, Tokyo (JP)

(73) Assignee: Hitachi High-Tech Corporation, Tokyo (JP)

(*) Notice: Subject to any disclaimer, the term of this patent is extended or adjusted under 35 U.S.C. 154(b) by 23 days.

(21) Appl. No.: 18/688,966

(22) PCT Filed: Aug. 3, 2022

(86) PCT No.: PCT/JP2022/029848
§ 371 (c)(1),
(2) Date: Mar. 4, 2024

(87) PCT Pub. No.: WO2023/037801
PCT Pub. Date: Mar. 16, 2023

(65) Prior Publication Data
US 2024/0377422 A1 Nov. 14, 2024

(30) Foreign Application Priority Data
Sep. 10, 2021 (JP) ................. 2021-147443

(51) Int. Cl.
*G01N 35/00* (2006.01)
*G05D 1/689* (2024.01)
(Continued)

(52) U.S. Cl.
CPC ... *G01N 35/0099* (2013.01); *G01N 35/00623* (2013.01); *G05D 1/6895* (2024.01);
(Continued)

(58) Field of Classification Search
CPC ........... G01N 35/0099; G01N 35/0062; G05D 1/6895; G05D 2101/22; G05D 2105/80;
(Continued)

(56) References Cited

U.S. PATENT DOCUMENTS

| 12,290,922 B2 * | 5/2025 | Tadayon | ................. F24S 25/70 |
| 2012/0152877 A1 * | 6/2012 | Tadayon | ................. F24S 25/10 |
| | | | 901/30 |

(Continued)

FOREIGN PATENT DOCUMENTS

| CN | 105913095 | * 5/2016 |
| JP | 2002-296284 A | 10/2002 |

(Continued)

OTHER PUBLICATIONS

International Search Report (PCT/ISA/210) issued in PCT Application No. PCT/JP2022/029848 dated Oct. 25, 2022 with English translation (4 pages).

(Continued)

*Primary Examiner* — Zaihan Jiang
(74) *Attorney, Agent, or Firm* — Crowell & Moring LLP (57) ABSTRACT This automated analysis support robot for carrying out an inspection of an analysis module that automatically analyzes a biological sample comprises a vehicle body, a camera mounted on the vehicle body, a communication device which communicates directly or indirectly with the analysis module, and a computer for controlling the vehicle body and the camera, wherein the computer: controls the vehicle body to move to a predetermined operating position and to face an inspection target provided in the analysis module; images the inspection target using the camera; and processes a video of the inspection target to calculate management data relating to the inspection target.

8 Claims, 8 Drawing Sheets (51) Int. Cl.
  *G06T 7/00* (2017.01)
  *G05D 101/00* (2024.01)
  *G05D 105/80* (2024.01)
(52) U.S. Cl.
  CPC ....... *G06T 7/0012* (2013.01); *G05D 2101/22* (2024.01); *G05D 2105/80* (2024.01); *G06T 2207/30004* (2013.01); *G06T 2207/30252* (2013.01)
(58) Field of Classification Search
  CPC ......... G06T 7/0012; G06T 2207/30004; G06T 2207/30252
  See application file for complete search history.

(56) References Cited

U.S. PATENT DOCUMENTS

| | | | | |
|---|---|---|---|---|
| 2018/0276933 | A1* | 9/2018 | Nakanishi | B65H 29/003 |
| 2019/0302135 | A1 | 10/2019 | Yoshida et al. | |
| 2019/0346465 | A1 | 11/2019 | Nagai et al. | |
| 2024/0275608 | A1* | 8/2024 | Cook | G06Q 30/018 |

FOREIGN PATENT DOCUMENTS

| | | | |
|---|---|---|---|
| JP | 2005-153104 A | | 6/2005 |
| JP | 2007-190641 A | | 8/2007 |
| JP | 2009109440 | * | 10/2007 |
| JP | 2016-68233 A | | 5/2016 |
| JP | 2020159879 | * | 3/2019 |
| JP | 2019-174369 A | | 10/2019 |
| JP | 2019-197021 A | | 11/2019 |
| JP | 2022054585 | * | 9/2020 |
| KR | 20190104480 | * | 8/2019 |

OTHER PUBLICATIONS

Japanese-language Written Opinion (PCT/ISA/237) issued in PCT Application No. PCT/JP2022/029848 dated Oct. 25, 2022 with English translation (9 pages).

Japanese-language International Preliminary Report on Patentability (PCT/IPEA/409) issued in PCT Application No. PCT/JP2022/029848 dated May 29, 2023, including Annexes with partial English translation (14 pages).

* cited by examiner

AUTOMATED ANALYSIS SUPPORT ROBOT, AND AUTOMATED ANALYSIS SYSTEM

TECHNICAL FIELD

The present invention relates to an automated analysis support robot for supporting an automated analysis of samples (biological samples) by an automatic analyzer for laboratory inspection, and an automated analysis system.

BACKGROUND ART

An automatic analyzer automatically analyzes specific components contained in a sample, such as blood and urine, and contributes to the improvement of the efficiency of inspection and analysis operations in the medical field. Recently, robots for supporting the inspection and analysis operations have been developed. For example, transportation of the sample and the like is a part of the inspection and analysis operations, and a robot that supports the transportation is included in the examples.

For example, Patent Document 1 discloses a transport robot that transports a liquid with low vibration in an examination room where people come and go. Patent Document 2 discloses a configuration and an operation of a robot arm that transports a sample container and a rack between a plurality of measurement devices. Patent Document 3 discloses a technique in which, in sample pretreatment apparatuses, a sample pretreatment apparatus to which a sample is transported is determined among a plurality of the sample pretreatment apparatuses corresponding to a content of measurement request, and the sample is transported to the determined sample pretreatment apparatus using a robot arm.

CITATION LIST

Patent Literature

Patent Literature 1: Japanese Unexamined Patent Application Publication No. 2016-68233
Patent Literature 2: Japanese Unexamined Patent Application Publication No. 2019-197021
Patent Literature 1: Japanese Unexamined Patent Application Publication No. 2019-174369

SUMMARY OF INVENTION

Technical Problem

Incidentally, automatic analyzers require various maintenances for properly performing inspections and analysis. For the further improvement of the efficiency of the inspection and analysis operations, it is important to maintain the operating rate of the automatic analyzer at a high level, and it is necessary to perform the maintenance at an appropriate timing before a defect leading to the reduction of the operating rate occurs. However, maintenance items are in the increasing trend in accordance with the increase of the items automatically performed by the automatic analyzer, and it is also important to reduce the load of maintenance on users.

It is an object of the present invention to provide an automated analysis support robot and an automated analysis system capable of reducing a load of maintenance of an automatic analyzer.

Solution to Problem

In order to achieve the above object, the present invention provides an automated analysis support robot configured to perform an inspection of an analysis module that automatically analyzes a biological sample. The automated analysis support robot comprises: a vehicle body; a camera mounted to the vehicle body; a communication device that directly or indirectly communicates with the analysis module; and a computer that controls the vehicle body and the camera. In the automated analysis support robot, the computer controls the vehicle body to move to a predetermined work area and face an inspection target included in the analysis module, photographs the inspection target with the camera, and processes an image of the inspection target to compute management data relating to the inspection target.

Advantageous Effects of Invention

According to the present invention, it is possible to reduce a load of maintenance of an automatic analyzer.

DESCRIPTION OF EMBODIMENTS

Figure 1:
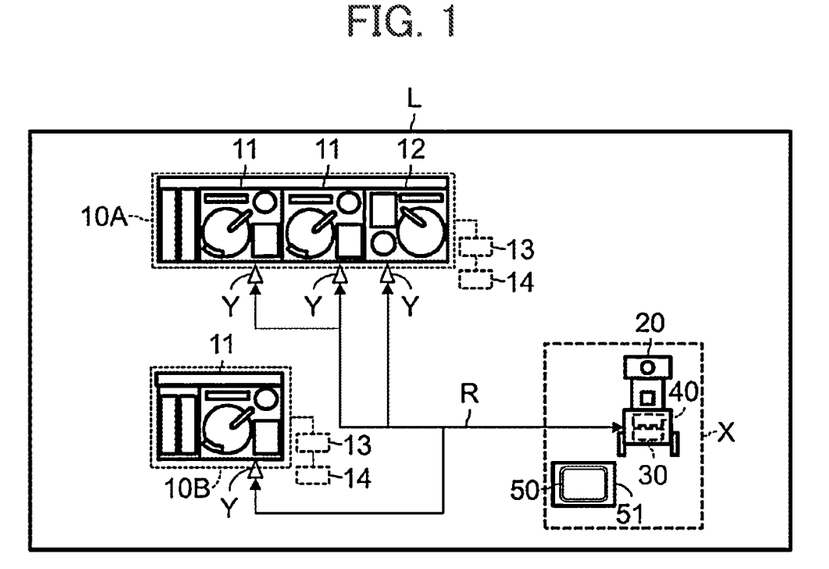
FIG. 1 is a schematic diagram illustrating an overall automated analysis system according to one embodiment of the present invention.

The following describes embodiments of the present invention with reference to the drawings.
—Automated Analysis System—
FIG. 1 is a schematic diagram illustrating an overall automated analysis system according to one embodiment of the present invention. The automated analysis system illustrated in the diagram includes automatic analyzers 10A, 10B, an automated analysis support robot 20 (hereinafter, robot 20), a computer 30, and a communication device 40.

The automatic analyzer 10A is a module type automatic analyzer including a plurality of analysis modules 11, 12, and the automatic analyzer 10B is a stand-alone type automatic analyzer including a single analysis module 11. The analysis modules 11, 12 are devices that automatically analyze (for example, measure a specific component) a sample (biological sample, such as blood and urine). While the analysis module is referred to as an automatic analyzer in some cases, to distinguish from the automatic analyzers 10A, 10B, the individual automatic analyzers constituting the automatic analyzers 10A, 10B are referred to as analysis modules in this embodiment. The analysis module 11 is, for example, an automatic biochemical analyzer, and the analysis module 12 is, for example, an automatic immunoanalyzer. The type and the combination of the analysis modules constituting the automatic analyzers 10A, 10B can be changed as necessary.

The robot 20 is an autonomous robot configured to perform inspections of the automatic analyzers 10A, 10B to support automated analyses by the automatic analyzers 10A, 10B. The computer 30 is a control device configured to control the robot 20, and the communication device 40 is a device configured to directly or indirectly communicate with the automatic analyzers 10A, 10B (in a precise sense, their computers). While the communication device 40 may be configured to communicate with the automatic analyzers 10A, 10B through wired communication, the communication device 40 is preferably configured to communicate with the automatic analyzers 10A, 10B through wireless communication. In this embodiment, an example in which the computer 30 and the communication device 40 are mounted to the robot 20 will be described. The analysis modules 11, 12 and the robot 20 will be described later, and the outline of the overall automated analysis system is described here with reference to FIG. 1.

Figure 2A:
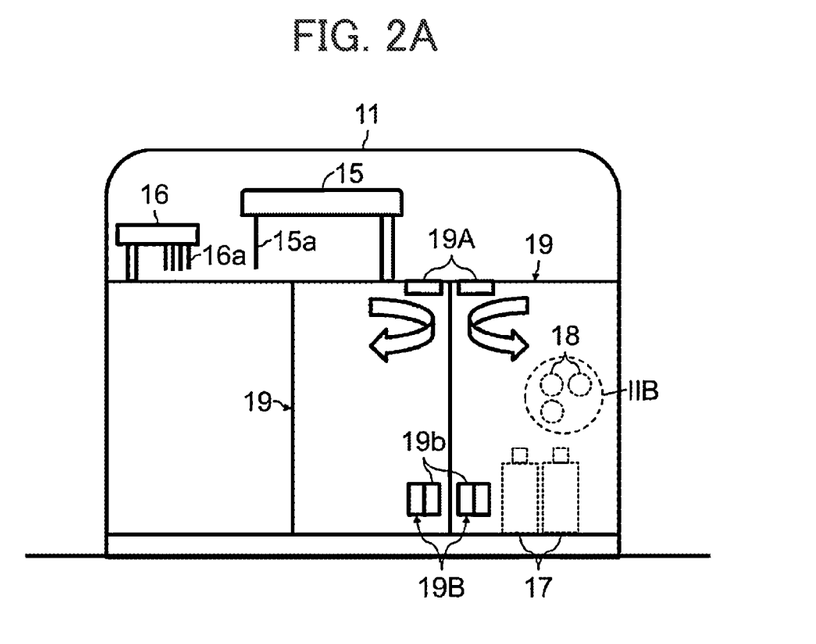
FIG. 2A is a front view schematically illustrating an appearance of an analysis module included in the automated analysis system according to the one embodiment of the present invention.

In the example of the diagram, the automatic analyzers 10A, 10B are disposed in a laboratory L, and arranged with predetermined spaces provided therearound to allow the user to easily perform operation and maintenance of the automatic analyzers 10A, 10B and easily pass through. This space double as a passage on which the robot 20 travels. For each of the analysis modules 11, 12, a predetermined work area Y in which the robot 20 operates is set. The work area Y is, for example, a position faced to a pressure gauge 18 (FIG. 2A) or a detergent container 17 (FIG. 2A) of the analysis modules 11, 12 across an opening/closing cover 19 (FIG. 2A).

In the laboratory L, a waiting area X for the robot 20 is set. The position of the waiting area X is set to avoid an assumed flow line of a user (human) without interfering with the action of the user. The robot 20 stands by in the waiting area X excluding the time during the carrying out of the maintenance. A charger (not illustrated) is installed in the waiting area X, and a battery (not illustrated) of the robot 20 is charged during the waiting in the waiting area X. The waiting area X is connected to each of the work areas Y by a predetermined route R, and the robot 20 moves between the waiting area X and the work area Y passing through the predetermined route R. Here, the route R can employ a configuration in which a physical route, such as a rail, a magnetic line, and a white line, is drawn and the robot 20 moves along the route. A positional relation between the waiting area X and the respective work areas Y may be stored in a memory of the computer 30 as data on traveling direction and distance, and the robot 20 may be traveled by the computer 30 based on the data. A positional coordinate of the waiting area X and the respective work areas Y may be stored in the memory of the computer 30, and the robot 20 may travel between specified coordinates in a local coordinate system of the laboratory L.

A stand 51 is installed in the waiting area X, and the stand 51 is provided with a console 50. The console 50 is an operation terminal operated by the user, and various kinds of computers including (or externally provided with) an input device, a monitor, and a communication device, for example, a tablet PC, a laptop PC, and a desktop PC, can be used. The console 50 is configured to be able to wirelessly communicate with the robot 20. The communication device included in the console 50 can be configured to directly or indirectly transmit and receive data with the communication device 40 included in the robot 20 by a communication system, for example, Wi-Fi (registered trademark), ZigBee (registered trademark), and Bluetooth (registered trademark).

A result of the maintenance performed by the robot 20 is available on the monitor of the console 50. The type of the maintenance and the timing of performing the maintenance by the robot 20 and the like can be set by the console 50 for each of the analysis modules 11, 12. According to the setting, the robot 20 moves to the work area Y of the target analysis module, and performs the set maintenance by a predetermined procedure. As the timing of the inspection by the robot 20, for example, in addition to the set time interval and the set time, a configuration in which the inspection is performed when the user manually instructs the inspection can be employed.

Each of the automatic analyzers 10A, 10B includes a computer 13 and a communication device 14. The computer 13 is an operation terminal for operating the automatic analyzer, and a control device configured to control the corresponding automatic analyzer. The computer 13 includes (or is connected to) the communication device 14. The computer 13 is configured to be able to wirelessly communicate with the robot 20 via the communication device 14. An analysis result of a sample by the analysis module is available on a monitor of the computer 13, and an analysis request to the automatic analyzer can be set by the computer 13.

The type, the number, and the layout of the automatic analyzers, the analysis modules, the robot 20, and the waiting area X disposed in the laboratory L are not limited to those in the example of FIG. 1. Data on the position, the type, and the like of the analysis modules on which the robot 20 performs the maintenance is preliminarily registered in the computer 30.

The arrangement of the overall automated analysis system in the laboratory has been described above.

—Analysis Module—

Figure 2B:
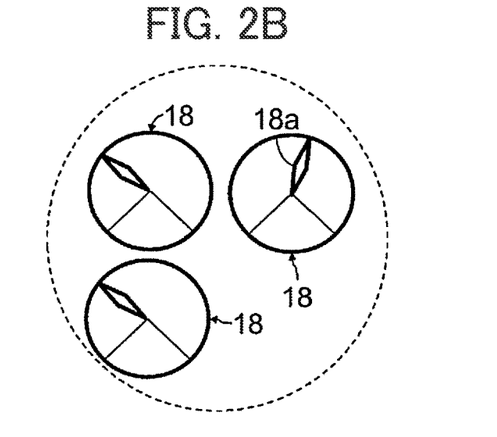
FIG. 2B is an enlarged view of a part IIB in FIG. 2A.
Figure 2C:
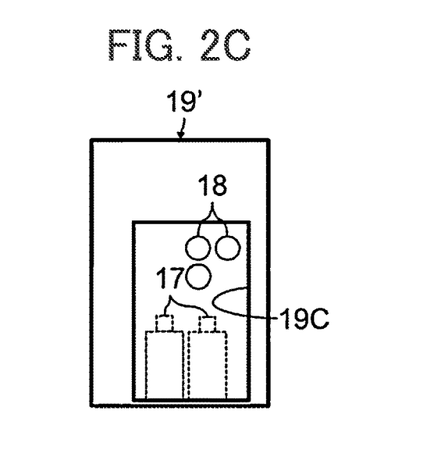
FIG. 2C is a diagram illustrating a modification of a cover of a body of the analysis module of FIG. 2A.

FIG. 2A is a front view schematically illustrating an appearance of an analysis module included in the automated analysis system according to the one embodiment of the present invention, FIG. 2B is an enlarged view of a part IIB in FIG. 2A, and FIG. 2C is a diagram illustrating a modification of a cover of a body of the analysis module of FIG. 2A.

The analysis module 11 illustrated in FIG. 2A dispenses a sample and a reagent to each of a plurality of reaction containers (not illustrated) by a dispenser 15 or the like, and measures a liquid obtained by reacting the sample and the reagent. To clean the reaction container in a sample analysis process, the analysis module 11 includes a waste liquid aspirator 16. The waste liquid aspirator 16 and the dispenser 15 have similar configurations in which arms rotate to move nozzles 15*a*, 16*a* and the liquid is aspirated or discharged through the nozzles 15*a*, 16*a*.

In the analysis module 11, a detergent (cleaning fluid) is used as a consumable item to clean the reaction containers in the sample analysis process. The detergent container 17 containing the detergent is set inside a body of the analysis module 11. The detergent container 17 is formed of a material that transmits a visible light, and one through which the detergent inside can be seen.

Further, to clean the nozzle 15*a* of the dispenser 15 and the reaction containers, the analysis module 11 includes multiple systems of pumps (not illustrated) configured to adjust an aspiration force (vacuum pressure) of a waste liquid of the waste liquid aspirator 16 and a discharge force (fluid pressure) of the detergent. These pumps include a large number of movable parts, such as a gear, a bearing, and a diaphragm valve, and when these movable parts are abraded or deteriorated, a required pump pressure cannot be output. The pump pressure has an influence on a dispensing amount and the like, and the analysis of the sample cannot be properly performed with reduced accuracy.

Therefore, to make the pump pressure confirmable by the user, the analysis module 11 includes pressure gauges 18 for the respective pumps in order to confirm the pump pressure by the user. Each of the pressure gauges 18 includes a pointer 18*a* that indicates a measured value of the pressure as illustrated in FIG. 2B, and the user confirms the pump pressure by reading a scale indicated by the pointer 18*a*. These pressure gauges 18 are also disposed inside the body of the analysis module 11.

Since the detergent container 17 is a device that needs to be replaced by the user, and the pressure gauge 18 is a device that requires visual check by the user, they are arranged at positions in the front side of the analysis module 11 to be easily accessed by the user. As described above, a plurality of the detergent containers 17 and a plurality of the pressure gauges 18 are provided in the analysis module 11. In this embodiment, the detergent containers 17 and the pressure gauges 18 are inspection targets of the robot 20.

The front surface of the body of the analysis module 11 is covered with the opaque opening/closing cover 19, and while the detergent containers 17 and the pressure gauges 18 as the inspection targets are covered with the opening/closing cover 19, opening the opening/closing cover 19 allows access to the detergent containers 17 and the pressure gauges 18. The opening/closing cover 19 is one replaced with an original cover of the analysis module 11, and as indicated by arrows in FIG. 2A, configured to be opened and closed by rotational motion having an arc trajectory around a vertical rotation axis provided at one end in left and right sides.

The opening/closing cover 19 is provided with a user handle 19A on which the user put the hand, and further, a robot handle 19B on which the robot 20 puts a hand 23*a*. The user handle 19A is positioned at the upper portion of the opening/closing cover 19 in the opposite side of the rotation axis. The robot handle 19B is positioned at the lower portion of the opening/closing cover 19 in the opposite side of the rotation axis. The robot handle 19B is configured to cover a part of an opening of a recess provided to the opening/closing cover 19 with a plate-shaped pull handle 19*b*.

Instead of the opening/closing cover 19, the front surface of the analysis module 11 may be covered with a partially transparent fixed cover 19' as illustrated in FIG. 2C. The cover 19' is provided with a window 19C to which a transparent member, such as acrylic and glass, is fitted, covers the detergent containers 17 and the pressure gauges 18, and the detergent containers 17 and the pressure gauges 18 are viewable from the work area Y through the window 19C. The whole of the cover 19' may be configured of a transparent member, such as acrylic. The cover 19' may be removable, and may be configured to be opened and closed as the opening/closing cover 19. In the case of the removable type, the user handle 19A and the robot handle 19B of the cover 19' may be omitted.

While the analysis module 11 has been described above, the analysis module 12 is also provided with the detergent and the pumps, and it is similar that the detergent containers 17 and the pressure gauges 18 are arranged behind the opening/closing cover 19 or the cover 19' to allow the easy access from the user.

The schematic configuration of the analysis modules 11, 12 and the arrangement of the detergent containers 17 and the pressure gauges 18 have been described above.

—Regarding Detergent Remaining Amount Management in Analysis Module—

Here, since the analysis modules 11, 12 cannot perform the normal analysis when the detergent is run out, they are often configured to stop the analysis operation when the detergent necessary for the analysis cannot be supplied. The sudden stop of the analysis operation wastes the sample being analyzed and the reagent. In contrast, the computer 13 is provided with a function to compute the detergent remaining amount from the detergent consumption amount based on the number of times of performing the analysis for each of the detergent containers 17 of the analysis modules 11, 12, and recommend the user to replace the detergent container 17 when the detergent remaining amount falls below a predetermined value in some cases.

However, since the detergent remaining amount computed by this function is an estimated value, and has an error to the actual remaining amount of the detergent, the detergent remaining amount needs to be estimated to be low by setting a margin in order to avoid the detergent shortage during the analysis. Therefore, when the detergent remaining amount computed by the computer 13 is excessively small compared with the actual remaining amount, the excess of the detergent is generated, thus increasing the waste of detergent and its purchase cost, and increasing the environmental cost relating to the process of the detergent. While it is considered to collect the excess detergent for the secondary use, in this case, there is a concern that the analysis accuracy is affected by the deterioration in quality of the detergent. Therefore, it is important to accurately obtain the remaining amount in real time and use up the detergent.

The user needs to reset the calculation data of the detergent remaining amount by operating the computer 13 of the analysis modules 11, 12 after the replacement of the detergent container 17. When this operation is forgotten, the computer 13 erroneously recognizes that the detergent remaining amount remains to be low in spite of the detergent container 17 immediately after the replacement, and the analysis operation of the analysis modules 11, 12 stops due to the shortage of the detergent remaining amount in the state where a large amount of the detergent is left. As a countermeasure to this, it is considered to provide the analysis module 11 with optical or contact type sensors configured to measure liquid level heights of the detergent of the respective detergent containers 17. However, not only it is necessary to install the sensor for each of the detergent containers 17, but also it is necessary for the user to frequently replace the detergent containers 17, and therefore, there is a concern that the installation of the sensor makes the replacement work of the detergent container 17 hard.

—Regarding Pump Pressure Management in Analysis Module—

The above-described pressure gauge 18 is an indicator to visually confirm the pump pressure by the user. A transducer configured to convert the pump pressure measured by the pressure gauge 18 into an electric signal is not provided with the analysis module 11. Therefore, the computer 13 of the analysis module 11 cannot acquire the pump pressure measured by the pressure gauge 18 as data. A plurality of the pumps are generally provided to the analysis module 11 as described above, and when the transducer is to be disposed, since the transducer is necessary for each of the pumps, the manufacturing cost of the analysis module 11 increases. As illustrated in FIG. 1, since a large number of the analysis modules 11, 12 are often disposed in the laboratory L, the increase of the price per analysis module 11, 12 increases the economic burden on the user.

—Automated Analysis Support Robot—

Figure 3A:
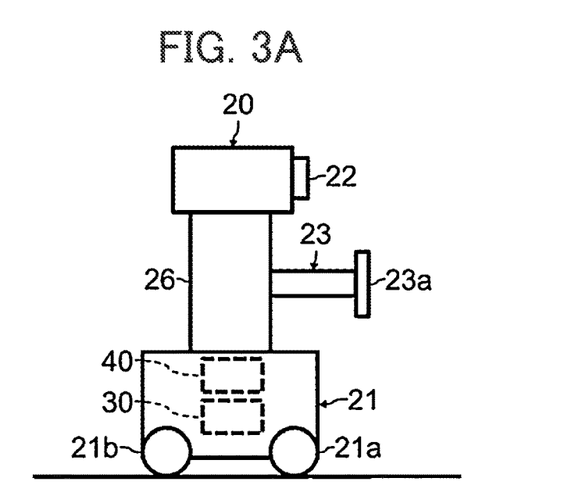
FIG. 3A is a side view of an automated analysis support robot according to the one embodiment of the present invention.
Figure 3B:
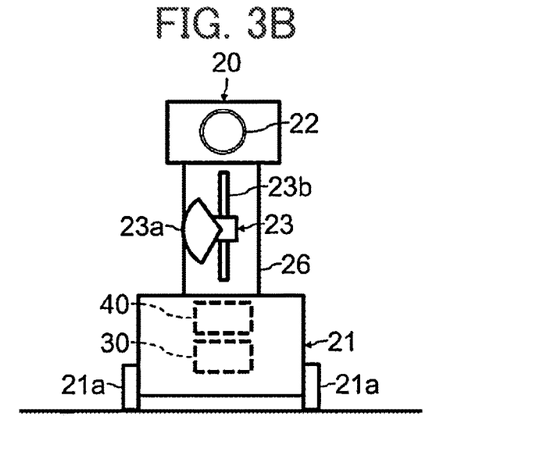
FIG. 3B is a front view of the automated analysis support robot according to the one embodiment of the present invention.

FIG. 3A is a side view of an automated analysis support robot according to the one embodiment of the present invention, and FIG. 3B is a front view. In these views, the right and the left of FIG. 3A are assumed to be the front and the back of the robot 20, and the right and the left of FIG. 3B are assumed to be the left and the right of the robot 20.

The robot 20 is an autonomous robot configured to perform the inspection of the detergent remaining amount and the pump pressure of the analysis modules 11, 12 as substitute for the user, and includes a vehicle body 21, a camera 22, a manipulator 23, the communication device 40, and the computer 30.

Vehicle Body

The vehicle body 21 is a wheel-type travel device with left and right front wheels 21a and left and right rear wheels 21b, but may be changed to a crawler-type travel device with left and right crawlers. Rotation speeds and rotation directions of the front wheels 21a and the rear wheels 21b can be controlled to be mutually independent in the left and the right, and thus operations of forward movement, backward movement, and turn are combined to allow the control of a distance and an azimuth angle in which the robot 20 travels. The robot 20 is provided with a magnetic or optical sensor to detect the route R as necessary.

Camera

The camera 22 is mounted to the vehicle body 21 via a vertically extending post 26. The post 26 is configured to rotate with respect to the vehicle body 21 around the center axis. The camera 22 is disposed at the upper portion of the post 26 in a posture having the optical axis to be approximately horizontal, and the camera 22 has a visual field rotatable in the horizontal direction with respect to the vehicle body 21 together with the post 26. Data of a still image and a moving image taken by the camera 22 is recorded in a memory included in the camera 22 or a memory of the computer 30.

Manipulator

The manipulator 23 is a working arm for opening and closing the opening/closing covers 19 of the analysis modules 11, 12, and horizontally extends. The manipulator 23 includes the hand 23a put on the robot handle 19B of the opening/closing cover 19. The hand 23a rotates in a vertical plane with a rotation axis (not illustrated) extending in the extending direction of the manipulator 23 (main body arm) as a fulcrum. The hand 23a may be configured to rotate alone, or the whole manipulator 23 may be configured to rotate. The hand 23a has a rotation axis shifted with respect to the center of the hand 23a, and the hand 23a has an asymmetrical shape with respect to the rotation axis.

The manipulator 23 can move up and down along a rail 23b extending in an up-down direction, and even when a height from the ground of the robot handle 19B changes, the position of the hand 23a with respect to the robot handle 19B can be adjusted by controlling the height of the manipulator 23.

Communication Device

The communication device 40 is a device to directly or indirectly communicate with the computers 13 of the analysis modules 11, 12. As the communication system of the communication device 40, for example, a wireless communication system, such as Wi-Fi (registered trademark), ZigBee (registered trademark), and Bluetooth (registered trademark), can be employed.

Computer

The computer 30 is a control device that controls the vehicle body 21 and the camera 22, and further, the post 26 and the manipulator 23, and is an arithmetic device that processes an image taken with the camera 22. In the inspection of the detergent container 17 or the pressure gauge 18, first, the computer 30 controls the vehicle body 21 to move the robot 20 to the target work area Y along the route R and face the detergent container 17 or the pressure gauge 18 as an inspection target. The computer 30 includes a CPU that serves as both an arithmetic device and a control device, and the memory as a storage device. In this description, various kinds of volatile and non-volatile storage devices, such as RAM, ROM, HDD, and SSD, are collectively referred to as a memory.

Next, the computer 30 takes an image of the detergent container 17 or the pressure gauge 18 with the camera 22, and processes the image of the detergent container 17 or the pressure gauge 18 to compute management data on the inspection target (that is, read from the image). The management data on the inspection target is an actual remaining amount of the detergent in the detergent container 17 and an indicated value of the pressure gauge 18. After the computing of the management data, the computer 30 transmits the management data to the computer 13 of the corresponding analysis module via the communication device 40.

The robot 20 has a function of measuring a distance to an obstacle with a distance sensor, such as an ultrasonic wave sensor, or a function of detecting a human with a motion sensor. When the motion sensor is provided, the travel can be stopped when the user (human) is detected in a region within a predetermined distance in the traveling direction during the travel. When the robot 20 operates in the laboratory L the same as the user, the robot 20 possibly obstructs the flow line of the user and interferes with the work of the user, but the configuration using the motion sensor to operate while avoiding the user allows avoiding obstructing the work of the user.

The configuration of the robot 20 has been described above.

—Cover Opening/Closing Operation—

Figure 4A:
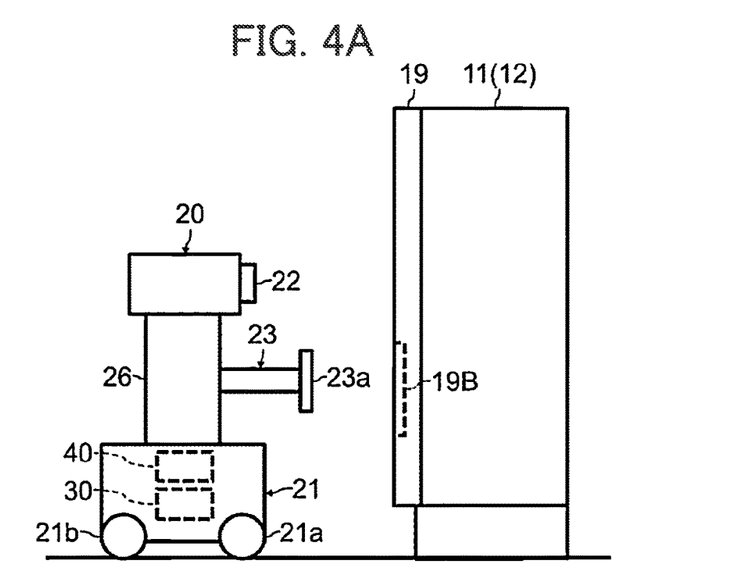
FIG. 4A is an explanatory view of a method for opening and closing an opening/closing cover of the analysis module by the automated analysis support robot according to the one embodiment of the present invention.
Figure 4B:
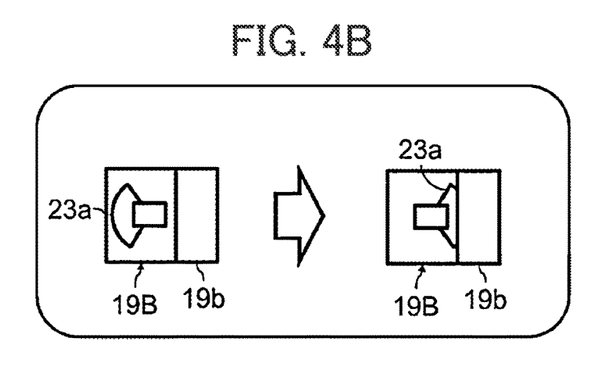
FIG. 4B is an explanatory view of the method for opening and closing the opening/closing cover of the analysis module by the automated analysis support robot according to the one embodiment of the present invention.

FIG. 4A and FIG. 4B are explanatory views of a method for opening and closing the opening/closing cover of the analysis module by the robot 20. While these diagrams illustrate a case where the target is the analysis module 11, the cover opening/closing operation is the same in a case where the target is the analysis module 12.

Different from the cover 19' illustrated in FIG. 2B, in the case of the analysis module employing the opening/closing cover 19 illustrated in FIG. 2A, it is necessary to open the opening/closing cover 19 to photograph the detergent container 17 or the pressure gauge 18 before facing the detergent container 17 or the pressure gauge 18 as the inspection target. When the opening operation of the opening/closing cover 19 is performed, the computer 30 controls the vehicle body 21 to move the robot 20 to the target work area Y and cause the robot 20 to face the robot handle 19B as illustrated in FIG. 4A.

Subsequently, the computer 30 controls the manipulator 23 to put the hand 23a on the robot handle 19B. Specifically, first, the computer 30 adjusts the height of the manipulator 23 to the height of the robot handle 19B based on data on the height from the ground of the robot handle 19B preliminarily recorded in the memory for each of the analysis modules. Then, the computer 30 controls the vehicle body 21 to cause the robot 20 to travel in a straight line toward the opening/closing cover 19 and insert the hand 23a into the robot handle 19B (left diagram in FIG. 4B). After the hand 23a is inserted into the robot handle 19B, the computer 30 rotates the hand 23a inside the robot handle 19B, and put the hand 23a on the pull handle 19b (right diagram in FIG. 4B).

After putting the hand 23a on the robot handle 19B, the computer 30 controls the vehicle body 21 to travel along the predetermined opening/closing trajectory of the opening/closing cover 19 (move backward in an arc shape) by a set distance in the state where the hand 23a is put on the robot handle 19B, thereby opening the opening/closing cover 19. During the opening of the opening/closing cover 19, the computer 30 controls the vehicle body 21 in a manner in which the manipulator 23 keeps the posture perpendicular to the opening/closing cover 19.

When the opening/closing cover 19 is open to a predetermined angle, the computer 30 rotates the hand 23a to release the hand 23a from the pull handle 19b of the robot handle 19B, and moves the robot 20 to the work area Y again to face the detergent container 17 and the pressure gauge 18.

When the opening/closing cover 19 is closed after the inspection of the detergent remaining amount or the pump pressure, the computer 30 closes the opening/closing cover 19 by executing a reverse procedure of the above-described procedure, and moves to the next work area Y or the waiting area X. At this time, when the opening/closing cover 19 is closed, the angle of the opening/closing cover 19 has possibly changed from that at the opening. This can be dealt with a configuration in which a preliminary action, such as starting the forward move from an angular position larger than the angle of the opening/closing cover 19 at the opening, detecting the robot handle 19B from a captured image of the camera 22, or measuring a distance to the opening/closing cover 19 with a distance sensor, is performed.

The opening/closing operation of the opening/closing cover 19 of the analysis modules 11, 12 by the robot 20 has been described above.

—Detergent Liquid Level Detection—

Figure 5A:
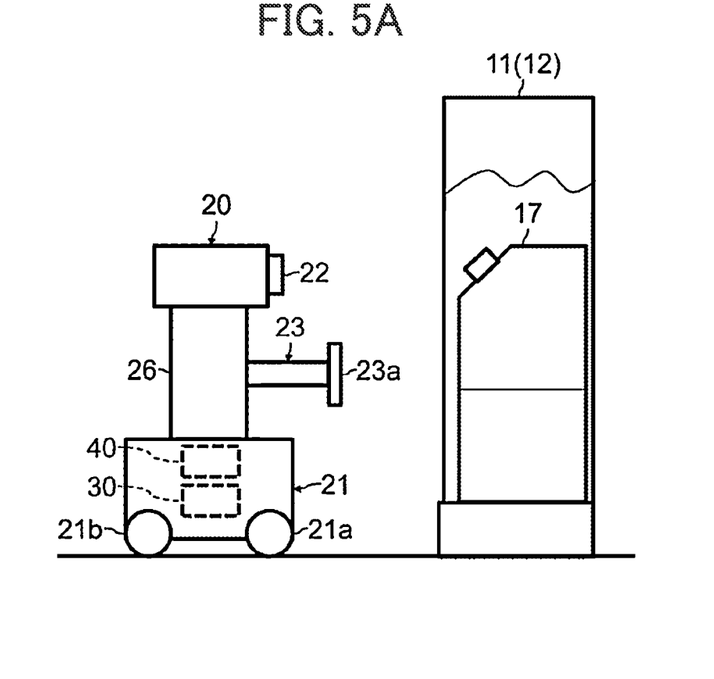
FIG. 5A is an explanatory view of a detergent liquid level detection operation of the automated analysis support robot according to the one embodiment of the present invention.
Figure 5B:
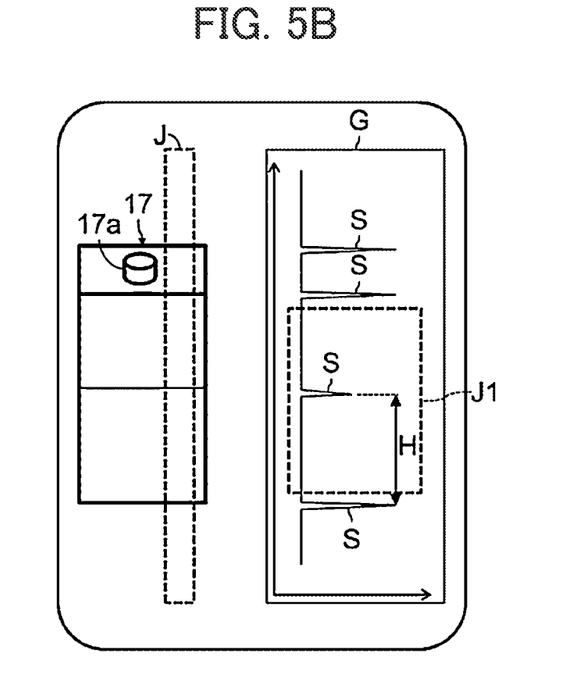
FIG. 5B is an explanatory view of the detergent liquid level detection operation of the automated analysis support robot according to the one embodiment of the present invention.

FIG. 5A and FIG. 5B are explanatory views of a detergent liquid level detection operation of the robot 20. In FIG. 5A, the body of the analysis module 11 is partially cut away, and the detergent container 17 inside is illustrated by a solid line. FIG. 5B illustrates an image of the detergent container 17 (left diagram) and an image processing image (right diagram) together. While FIG. 5A and FIG. 5B illustrate a case where the target is the analysis module 11, the detergent liquid level detection operation is the same in a case where the target is the analysis module 12.

After the opening/closing cover 19 is opened as necessary, and the robot 20 faces the detergent container 17 set in the analysis module 11 (FIG. 5A), the computer 30 controls the camera 22 to take an image (still image or moving image) including the whole detergent container 17, and records it in the memory. At this time, in the memory of the computer 30, data on the position, the type, and the number of the detergent containers 17 set in the analysis module 11 is recorded. The computer 30 moves to a position appropriate for photographing the target detergent container 17 in the work area Y based on the data, faces the target detergent container 17, and photographs the detergent container 17. The detergent containers 17 may be photographed one by one, and a plurality of the detergent containers 17 may be photographed together. In the case where a plurality of the detergent containers 17 are photographed together, when the image processing is affected by various aberrations, such as a distortion aberration, depending on the view angle of the camera 22, these aberrations can be corrected before saving in the memory.

As illustrated in FIG. 5B, the image taken by the robot 20 is an image of the detergent container 17 taken from the front side. To perform liquid level image processing by processing the image of the detergent container 17, an image processing determination range J is preliminarily set to the image of the detergent container 17 for each type of the detergent container 17. The image processing determination range J is an image region that vertically traverses the detergent container 17, and set to avoid unevenness, such as a port 17a, for providing an image region of only an outer wall surface of the detergent container 17 as much as possible. The computer 30 performs edge computing having a magnitude of image brightness changing rate as a signal strength on the image processing determination range J, thus acquiring data G on the signal strength and the height. For the data G illustrated in FIG. 5B, the horizontal axis indicates the signal strength, and the vertical axis indicates the height position.

When the edge computing is performed, since a strong signal is acquired at a height at which the image brightness significantly changes, as illustrated in the diagram, strong edge detection signals S are acquired at the upper end, the lower end, a bent portion of the outer wall surface, and a detergent liquid level of the detergent container 17. Excluding the detergent liquid level, the upper end, the lower end, and the bent portion of the outer wall surface of the detergent container 17 are already-known for each type of the detergent container 17, and data on these height positions or relative positional relations is preliminarily recorded in the memory. Additionally, a range of J1 of the height that the detergent liquid level can have in the image processing determination range J is preliminarily set for each of the types of the detergent container 17, and stored in the memory. In the example of FIG. 5B, the range J1 is set between the height of the lower end and the height of the bent portion of the outer wall surface of the detergent container 17. That is, the edge detection signal S detected in the range J1 is the position of the detergent liquid level.

The computer 30 computes a distance in the vertical direction (difference in height) between the position at which the edge detection signal S is detected in the range J1 and the position at which the edge detection signal S corresponding to the lower end of the detergent container 17 is detect, and records the distance (difference in height) as a detergent liquid level height H in the memory.

Depending on the shape of the detergent container 17, a plurality of the edge detection signals possibly appear in the above-described range J1. In this case, data (acquired similarly to the data G) acquired by preliminarily photographing the same detergent container 17 in the empty state and performing image processing thereon is stored in the memory as reference data. Then, by obtaining a difference between the data G acquired for the detergent container 17 as the inspection target of the detergent remaining amount and the reference data, the liquid level position of the detergent can be detected.

The detergent liquid level detection operation inside the detergent container 17 of the analysis modules 11, 12 has been described above.

—Actual Detergent Remaining Amount Computing—

Figure 6A:
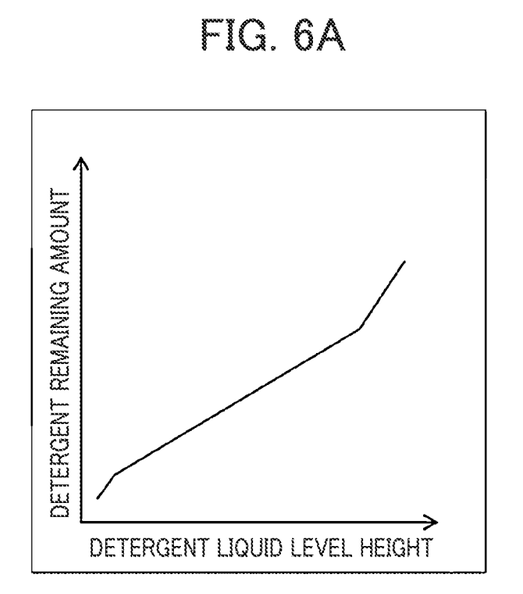
FIG. 6A is an explanatory view of a method for computing an actual detergent remaining amount by the automated analysis support robot according to the one embodiment of the present invention.
Figure 6B:
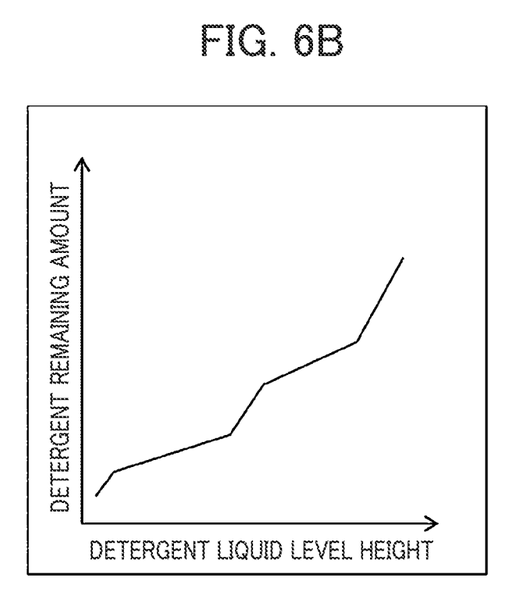
FIG. 6B is an explanatory view of the method for computing the actual detergent remaining amount by the automated analysis support robot according to the one embodiment of the present invention.

FIG. 6A and FIG. 6B are explanatory views of a method for computing an actual detergent remaining amount by the robot 20. These diagrams illustrate data specifying the relation between the detergent liquid level height (horizontal axis) and the detergent remaining amount (vertical axis). Since the detergent container 17 have the different shape depending on the type (that is, the change of the cross-sectional area depending on the height), such a kind of data is preliminarily specified for each type of the detergent container 17 and recorded in the memory. That is, the data illustrated in FIG. 6A is data on a type A of the detergent container 17, and the data illustrated in FIG. 6B is data on a type B of the detergent container 17. These pieces of the data may be created by computing from known shape data of the detergent container 17, and may be experimentally created by actually pouring a liquid in the detergent container 17. When the data illustrated in FIG. 6A and FIG. 6B is specified by computing, an arithmetic expression below can be used.

$$V = \int [0, H] Da(h) dh / 1000$$

Note that, V: detergent remaining amount [mL], H: detergent liquid level height [mm], and Da (h): cross-sectional area [mm$^2$] of detergent container at height h.

The computer 30 converts the detergent liquid level height H computed in the detergent liquid level detection into the detergent remaining amount based on the relation data illustrated in FIG. 6A and FIG. 6B.

The method for computing the actual detergent remaining amount from the detergent container liquid level height has been described above.

—Detergent Remaining Amount Display—

Figure 7:
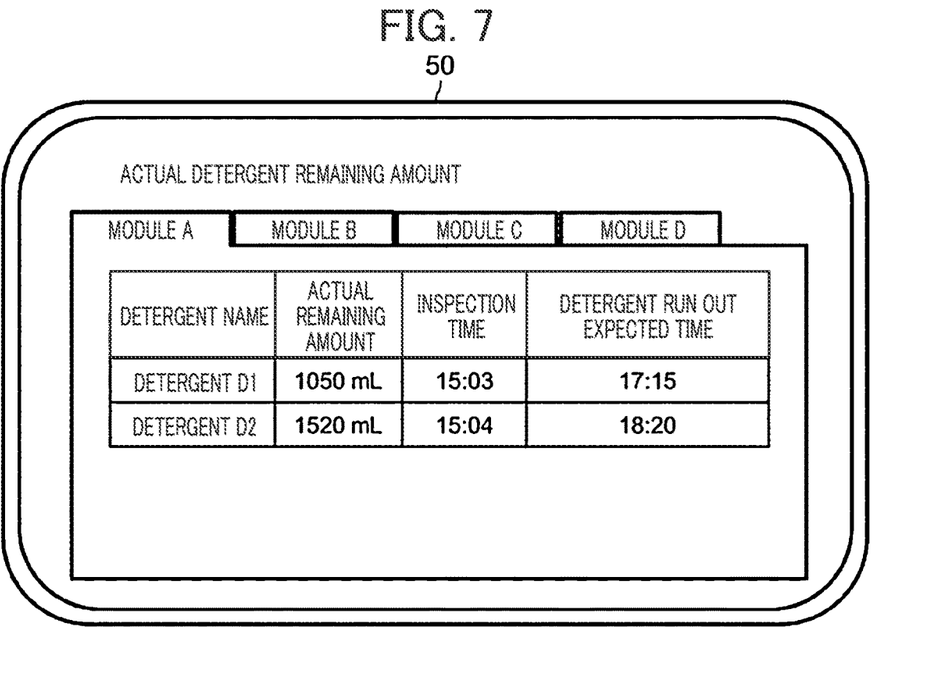
FIG. 7 is a diagram illustrating an exemplary display screen of the actual detergent remaining amount inspected by the automated analysis support robot according to the one embodiment of the present invention.

FIG. 7 is a diagram illustrating an exemplary display screen of the actual detergent remaining amount inspected by the automated analysis support robot according to the one embodiment of the present invention.

The computer 30 communicates with the console 50, and displays the latest actual detergent remaining amount inspected by the above-described method and the inspection time on the console 50 for each type of the detergent (or detergent container 17). The computer 30 reads inspection histories of the respective detergent containers 17 from the memory, computes a time at which the detergent remaining amount becomes 0 as a detergent run out expected time based on a consumption pace of the detergent obtained from the actual detergent remaining amounts and its inspection times of a plurality of the inspections, and displays it together on the console 50. A detergent run out expected time t3 can be obtained by, for example, an arithmetic expression below.

$$t3 = (V2 \times t1 - V1 \times t2)/(V2 - V1)$$

Note that, t2: detergent inspection time of latest inspection, t1: detergent inspection time of previous inspection, V2: actual detergent remaining amount in latest inspection, V1: actual detergent remaining amount in previous inspection.

When the actual detergent remaining amount V2 in the latest inspection is equal to or more than the actual detergent remaining amount V1 in the previous inspection (V2≥V1), since the detergent run out expected time t3 cannot be computed, [–] is to be displayed in the detergent run out expected time on an actual detergent remaining amount screen of the console 50.

The computer 30 stores the inspection data of the actual remaining amount of each detergent container 17 (or each type of the detergent) for all of the analysis modules 11, 12 installed in the laboratory L. For example, by operating the console 50 (in the example of FIG. 7, selecting tabs indicating "Module A," "Module B," . . . ), the inspection data of the actual detergent remaining amount of each of the analysis modules can be switched to be displayed on the console 50. For example, when the operation of selecting "Module B" is performed in the state of FIG. 7, the console 50 transmits a request signal to the computer 30, the computer 30 transmits the data of the selected analysis module to the console 50 corresponding thereto, and the data is displayed.

The display screen of the actual detergent remaining amount inspected by the robot 20 has been described above.

—Detergent Remaining Amount Data Update—

Figure 8:
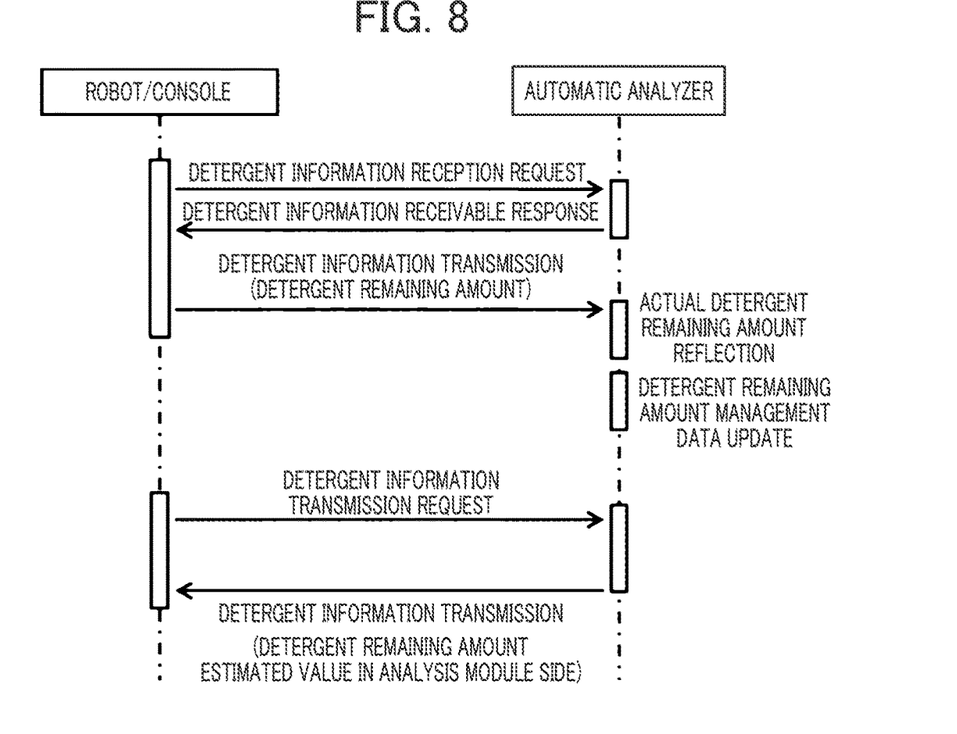
FIG. 8 is an explanatory view of a method for reflecting the actual detergent remaining amount inspected by the automated analysis support robot on management data of a computer in the analysis module according to the one embodiment of the present invention.

FIG. 8 is an explanatory view of a method for reflecting the actual detergent remaining amount inspected by the robot 20 on management data of the computer 13 of the analysis module. While the diagram illustrates a case where the target is the analysis module 11, the detergent liquid level detection operation is the same in a case where the target is the analysis module 12. The data transmission/reception of FIG. 8 is performed between the computer 30 mounted to the robot 20 and the computer 13 that manages the analysis module 11 via the respective communication devices 40, 14.

After the inspection of the actual detergent remaining amount as described above, the robot 20 transmits a signal of detergent information reception request to the computer 13 that manages the detergent remaining amount of the analysis module as a data update target. The analysis module as a data update target is, for example, the analysis module 11 on which the actual detergent remaining amount has been already inspected, and the analysis module 11 that the robot 20 currently faces can be exemplified.

The computer 13 that has received the request signal transmits a signal of detergent information receivable response to the computer 30 of the robot 20 when the detergent information of the target analysis module is transmittable. However, there is a case where the computer 13 in the analysis module side cannot receive the signal or cannot respond even when the signal has been received, for example, a case where the computer 30 is stopped or a case where the analysis module 11 is turned off or its similar case. For example, in such a case, when the signal from the computer 13 in the analysis module side is not received within a certain period of time, the computer 30 mounted to the robot 20 terminates the process as a communication error.

When the signal of detergent information receivable response is received from the computer 13 in the analysis module side, the computer 30 transmits the latest actual detergent remaining amount data to the computer 13 in the analysis module side as the detergent information. The computer 13 in the analysis module side reflects the received actual detergent remaining amount data on the management data of the target analysis module, and updates the management data of the detergent remaining amount that the computer 13 in the analysis module side manages by itself. The computer 13 updates the management data of the detergent remaining amount by a method of estimation calculation of the detergent consumption amount based on the number of times of the analysis performed until the opportunity of updating the actual detergent remaining amount inspected by the robot 20 comes again.

The computer 30 in the robot 20 side cannot obtain the actual value of the detergent remaining amount of the target analysis module until the next opportunity of inspecting the actual detergent remaining amount by the robot 20, and a divergence between the data on the actual detergent remaining amount held by the computer 30 in the robot 20 side and the actual detergent remaining amount gradually increases. In this case, the value on the actual detergent remaining amount screen indicated by the console 50 deviates from the actual value.

Therefore, during a period after the end of the inspection of the actual detergent remaining amount by the robot 20 to the opportunity of the next inspection, a synchronization process with the management data on the detergent remaining amount of the computer 13 in the analysis module side is executed. At regular time intervals, or corresponding to the operation of the console 50 by the user, the computer 30 transmits a signal of detergent information transmission request to the computer 13 in the analysis module side. The computer 13 that has received the signal transmits the data on the detergent remaining amount continued to be updated by the estimation calculation based on the number of times of the analysis performed as described above to the computer 30 in the robot side as the detergent information. The computer 30 records the received data on the management data of the detergent remaining amount saved in itself.

The method for reflecting the actual detergent remaining amount inspected by the robot 20 on the management data of the computer 13 in the analysis module has been described above.

—Pump Pressure Reading—

Figure 9A:
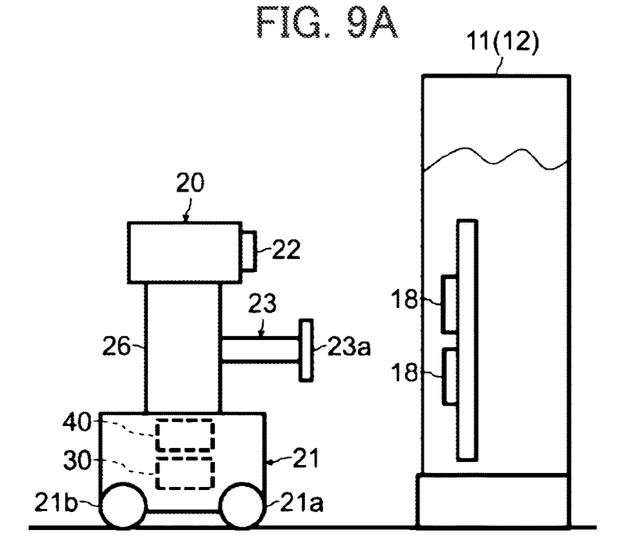
FIG. 9A is an explanatory view of a pump pressure reading operation by the automated analysis support robot according to the one embodiment of the present invention.
Figure 9B:
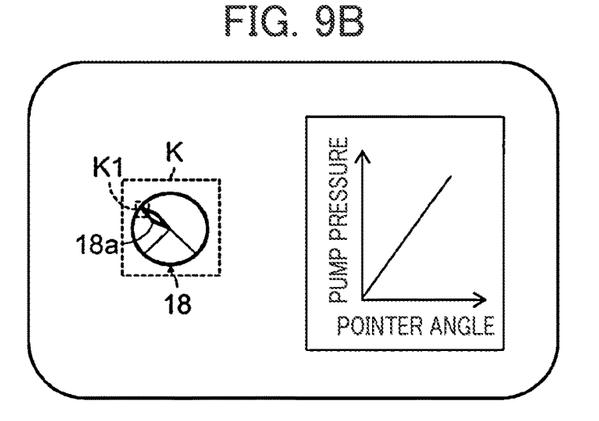
FIG. 9B is an explanatory view of the pump pressure reading operation by the automated analysis support robot according to the one embodiment of the present invention.

FIG. 9A and FIG. 9B are explanatory views of a pump pressure reading operation by the automated analysis support robot according to the one embodiment of the present invention. In FIG. 9A, the body of the analysis module 11 is partially cut away, and the pressure gauge 18 inside is illustrated by a solid line. FIG. 9B illustrates image of the pressure gauge 18 (left diagram) and data specifying a relation between an angle of the pointer 18*a* and a pump pressure (right diagram) together. While FIG. 9A and FIG. 9B illustrate a case where the target is the analysis module 11, the pump pressure reading operation is the same in a case where the target is the analysis module 12.

After the opening/closing cover 19 is opened as necessary, and the robot 20 faces the pressure gauge 18 included in the analysis module 11 (FIG. 9A), the computer 30 controls the camera 22 to take an image (still image or moving image) including the pressure gauge 18, and records it in the memory. At this time, in the memory of the computer 30, data on the position, the type, and the number of the pressure gauges 18 included in the analysis module 11 is recorded. The computer 30 moves to a position appropriate for photographing the target pressure gauge 18 in the work area Y based on the data, faces the target pressure gauge 18, and photographs the pressure gauge 18 for a certain period of time. The pressure gauges 18 may be photographed one by one, and a plurality of the pressure gauges 18 may be photographed together. In the case where a plurality of the pressure gauges 18 are photographed together, when the image processing is affected by various aberrations, such as a distortion aberration, depending on the view angle of the camera 22, these aberrations can be corrected before saving in the memory.

Since the pointer 18*a* of the pressure gauge 18 moves during the operation of the analysis module 11, the computer 30 takes the moving image by the camera 22 to acquire necessary information. The shooting period of the moving image is set to a time period of a predetermined number of cycles based on an analysis cycle time of the analysis module 11. For example, when the analysis cycle time of the analysis module 11 is set to 1.8 seconds, and the predetermined number of cycles is set to 10 cycles, the shooting period is 18 seconds. The predetermined number of cycles is set in advance in consideration of an amplitude, a deflection, and the like of the pointer 18*a*. A sampling frame of the moving image shooting is configured to sufficiently capture the operation of the pointer 18*a*. A large number of still images constituting the shot moving image are each saved in the memory with the shooting period. The following describes the contents of a sequence of image processing.

As illustrated in FIG. 9B, the image taken by the robot 20 is an image of the pressure gauge 18 taken from the front side. To read the pump pressure by processing the image of the pressure gauge 18, an image processing determination range K is preliminarily set to the image of the pressure gauge 18 so as to include the whole pressure gauge 18. In the image processing determination range K, a pointer tracking point K1 is internally set. The pointer tracking point K1 is a distal end of the pointer 18*a* searched by the computer 30 based on shape feature points of the pointer 18a preliminarily stored in the memory. Data on XY-coordinates of the pointer tracking point K1 in the image processing determination range K is identified for each of the still images constituting the shot moving image and recorded in the memory.

Next, the computer 30 obtains an origin O (corresponding to the rotational center of the pointer 18a) from the coordinate data of the pointer tracking point K1 of three still images selected according to a predetermined algorithm. Specifically, triangles having the pointer tracking points K1 of the three still images as vertex angles are hypothesized, and an intersection point of perpendicular bisectors of two sides other than the longest side of the hypothesized triangle can be obtained as the origin O. To ensure the computation accuracy of the coordinate of the origin O, it is preferred to specify the algorithm such that the three still images are selected to have the two sides of the above-described hypothesized triangle to be long as much as possible. Selecting a larger number of the still images, computing a plurality of the coordinates of the origin O, and obtaining the average of the coordinates of the origin O, the computation accuracy of the origin O can be more improved. When the origin O is obtained, the computer 30 converts the XY-coordinate systems (orthogonal coordinate systems) of the respective still images into a polar coordinate system having the origin O as the origin, computes angles θ of a line segment (corresponding to the pointer 18a) connecting between the pointer tracking point K1 and the origin O in the respective still images, and records the angles θ in the memory.

The memory of the computer 30 stores data specifying a relation between an angle of the pointer 18a and the pump pressure as illustrated in the right side of FIG. 9B. Since the scale of the pressure gauge 18 is different depending on the type, the data is preliminarily specified for each type of the pressure gauge 18, and recorded in the memory. The computer 30 converts the angle of the pointer 18a into the pump pressure based on the relation data illustrated in FIG. 9B, and reads the pump pressure indicated by the pointer tracking point K1 in each of the still images.

The detection of the pointer 18a of the pressure gauge 18 and the reading of the pump pressure indicated by the pointer 18a have been described above.

—Pump Pressure Computing—

Figure 10:
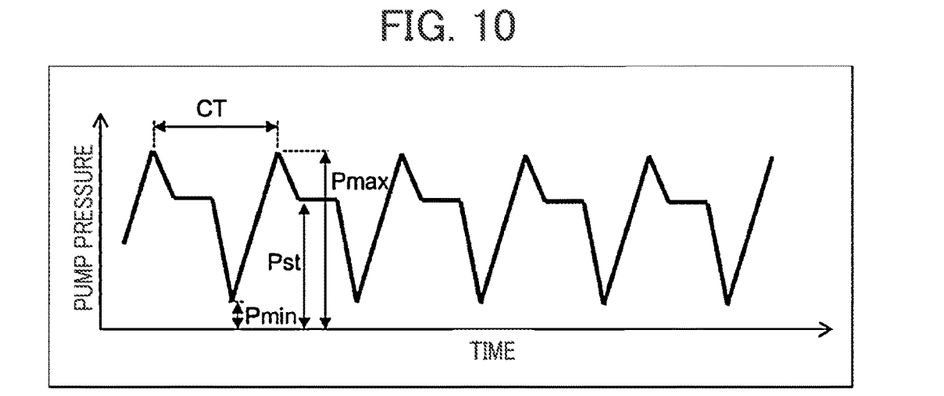
FIG. 10 is a diagram illustrating a time related change of the pump pressure in a certain period of time computed from an image taken by the automated analysis support robot according to the one embodiment of the present invention.

FIG. 10 is a diagram illustrating a time related of the pump pressure in a certain period of time computed from an image taken by the robot 20.

As described above, each of the still images constituting the moving image is associated with the data on the shot time, and plotting the data on the pressure and the time of each image on a coordinate system having the horizontal axis as a time axis and the vertical axis as a pressure axis provides data on time related (FIG. 10) of the pump pressure (actual indicated value of the pressure gauge 18). The computer 30 stores the analysis cycle time CT of the analysis module 11 in the memory, and computes a maximum pressure Pmax, a minimum pressure Pmin, and a stable pressure Pst for each analysis cycle time CT from the data on the pump pressure and the time of each image.

As described above, since the shooting period of the moving image is set to a time period of a predetermined number of cycles (for example, 10 cycles) based on the analysis cycle time CT, the maximum pressure Pmax, the minimum pressure Pmin, and the stable pressure Pst of the predetermined number of cycles (for example, 10 cycles) are each computed. The maximum pressure Pmax and the minimum pressure Pmin are a maximum value and a minimum value of the pump pressure in one cycle time CT. The stable pressure Pst is, for example, a mode value when a histogram analysis of the pump pressure in one cycle time CT is performed. The computer 30 thus obtains the maximum pressure Pmax, the minimum pressure Pmin, and the stable pressure Pst for each analysis cycle time CT, and computes respective average values of the maximum pressure Pmax, the minimum pressure Pmin, and the stable pressure Pst. The respective average values of the maximum pressure Pmax, the minimum pressure Pmin, and the stable pressure Pst are recorded in the memory in association with the inspection date and time as the inspection values of the pump pressure (read values of the display on the pressure gauge 18).

The method for computing the pump pressure from the image taken by the robot 20 has been described above.

—Pump Pressure Display—

Figure 11A:
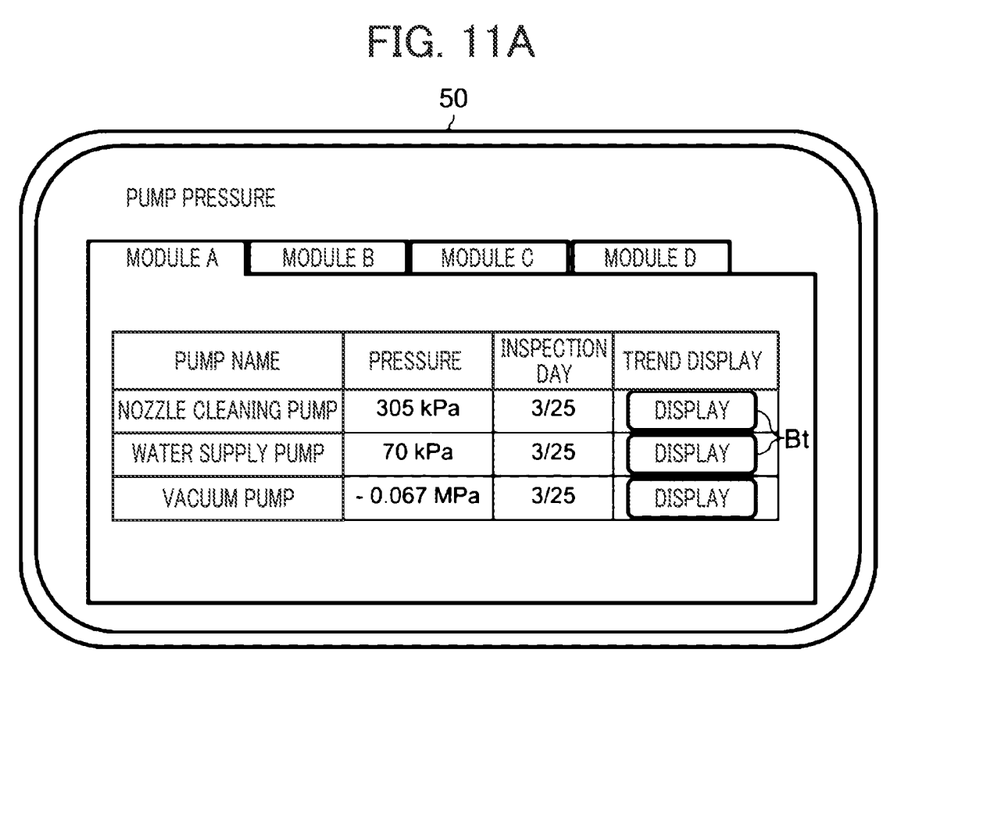
FIG. 11A is a diagram illustrating an exemplary display screen of the pump pressure inspected by the automated analysis support robot according to the one embodiment of the present invention.

FIG. 11A is a diagram illustrating an exemplary display screen of the pump pressure inspected by the automated analysis support robot according to the one embodiment of the present invention.

The computer 30 communicates with the console 50, and displays the latest pump pressure inspected by the above-described method and the inspection time on the console 50 for each pressure gauge 18 (or pump corresponding to the pressure gauge 18). FIG. 11A illustrates the stable pressure Pst as the pump pressure. This is because the stable pressure is generally used as an index in the operation of the analysis module. However, the maximum pressure Pmax and the minimum pressure Pmin can be displayed by a predetermined operation as well.

The computer 30 stores the inspection data of the pump pressure of each pressure gauge 18 (or pump corresponding to the pressure gauge 18) for all of the analysis modules 11, 12 installed in the laboratory L. For example, by operating the console 50 (in the example of FIG. 11A, selecting tabs indicating "Module A," "Module B," . . . ), the inspection data of the pump pressure of each of the analysis modules can be switched to be displayed on the console 50. For example, when the operation of selecting "Module B" is performed in the state of FIG. 11A, the console 50 transmits a request signal to the computer 30, the computer 30 transmits the data of the selected analysis module to the console 50 corresponding thereto, and the data is displayed.

The computer 30 stores a history of the inspection data of the pump pressure in the memory. As illustrated in FIG. 11A, the display screen of the pump pressure of the embodiment indicates display buttons Bt to display a trend in a long period of time of the inspection value of the pump pressure. By operating the display button Bt, a screen (FIG. 11B) indicating the trend of the pump pressure in a specified period (for example, the last several months) having the horizontal axis as the time (for example, date) and the vertical axis as the pump pressure is displayed based on the history data saved in the computer 30. The user can estimate the sign of failure and deterioration of the pump from the screen of FIG. 11B.

Figure 11B:
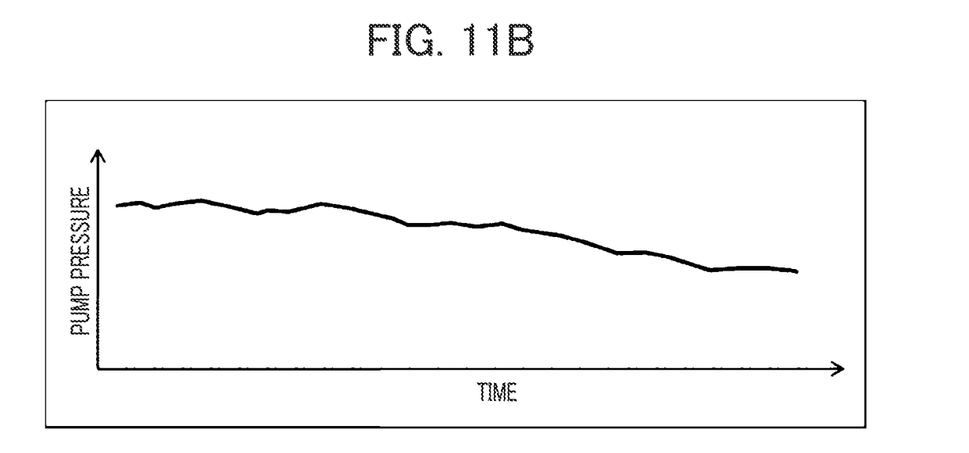
FIG. 11B is a diagram illustrating an exemplary display of a trend of the pump pressure inspected by the automated analysis support robot according to the one embodiment of the present invention.

To more accurately know the sign of failure and deterioration of the pump, it is considered to evaluate the state of the pump from a difference between the data of the pump pressure illustrated in FIG. 10 and reference data of the pump pressure preliminarily acquired for a normal pump. For the data on the inspection value and the inspection time of the pump pressure, it is considered to employ an evaluation of Mahalanobis' distance by Mahalanobis-Taguchi method. The data on the pump pressure acquired by the inspection by the robot 20 is accumulated as big data in association with data on the model of the analysis module, the environment and operation information of the laboratory L, and the like. In this case, applying data analysis by AI to the big data is useful for exploring more accurate and more efficient operation methods of the analysis modules 11, 12 and the laboratory L.

The display of the pump pressure inspected by the robot 20 has been described above.

—Effects—

(1) As described above, the robot 20 can photograph the inspection target, such as the detergent container 17 and the pressure gauge 18, with the camera 22, and process the taken image with the computer 30 to read the management data, such as the actual detergent remaining amount and the indicated value of the pressure gauge 18, as substitute for the user. Accordingly, the load on the user relating to the maintenance of the automatic analyzer can be reduced.

The robot 20 performs the work of the user, such as a visual check of the detergent container 17 and the pressure gauge 18, as substitute for the user. Accordingly, the inspection of the detergent container 17 and the pressure gauge 18, which is performed or not performed depending on the situation of the user, can be daily and mechanically performed at a stable timing (for example, every one hour).

By setting the timing of the inspection by the robot 20 in consideration of the work timing of the user, the inspection can be performed by the robot 20 without interfering with the user work. By utilizing the robot 20 that can be introduced at low cost, it is not necessary to provide a liquid level sensor for each detergent container 17 or provide a transducer for each pressure sensor, and the operating rate of the automatic analyzer can be improved while suppressing the increase in cost of the automatic analyzer.

(2) Even when the detergent container 17 or the pressure gauge 18 as the inspection target is covered with the opening/closing cover 19 of the analysis modules 11, 12 and cannot be photographed, the robot 20 can use the manipulator 23 to open and close the opening/closing cover 19 by itself. This eliminate the need for the preparatory work by the user, such as opening/closing the opening/closing cover 19 for the inspection by the robot 20.

(3) Since the actual detergent remaining amount inspected by the robot 20 is transmitted and fed back to the computers 13 of the analysis modules 11, 12, the actual remaining amount of the detergent that cannot be acquired by the analysis module side can be reflected on the management data as necessary. This allows suppressing the divergence between the detergent remaining amount managed by the computer 13 and the actual remaining amount.

(4) When the existing cover of the body of the analysis modules 11, 12 has a structure unsuitable for opening/closing by the robot 20, by replacing the existing cover with the opening/closing cover 19 (FIG. 2A) having the robot handle 19B, the autonomous structure of the robot 20 can be supported. By replacing with the cover 19' as illustrated in FIG. 2B, it is not necessary to open and close the cover when the inspection target is photographed, thus allowing the support of the autonomous structure of the robot 20 and allowing omitting the manipulator 23 of the robot 20 leading to the cost reduction of the robot 20.

Modification

While the above-described embodiment is described with an example of the configuration in which the computer 30 that controls the robot 20 and executes the image processing is mounted to the robot 20, the functions of the computer 30 can be assigned to a plurality of computers. For example, the computer 30 can be provided as a first computer, a computer (for example, console 50) disposed separately from the automatic analyzers 10A, 10B and the robot 20 can be provided as a second computer, and the functions can be assigned to these two computers. In this case, the first computer mounted to the robot 20 photographs the inspection target, such as the detergent container 17, with the camera 22 corresponding to the command from the second computer, and transmits the image of the inspection target to the second computer via a communication module (communication device 40) without performing the image processing. Then, the second computer processes the image of the inspection target to compute the management data (actual detergent remaining amount or the like) relating to the inspection target, and transmits the management data to the computer 13 of the analysis module via the communication device. For the travel of the robot 20 and the operation of the photographing during the time, both of a configuration in which the first computer controls the vehicle body 21 and the like corresponding to a trigger signal from the second computer and a configuration in which the first computer drives the vehicle body 21 and the like corresponding to a control command value from the second computer can be applied.

When the pump pressure is managed by the computers 13 that manages the analysis modules 11, 12, the data on the pump pressure inspected using the robot 20 may be transmitted to the computers 13.

For example, when the robot 20 is configured to have the position of the hand 23a to be adjustable to the user handle of the original opening/closing cover of the body of the analysis modules 11, 12, it is not necessary to replace the body cover of the analysis modules 11, 12 with the dedicated opening/closing cover 19.

LIST OF REFERENCE SIGNS 11, 12: Analysis module
17: Detergent container (inspection target)
18: Pressure gauge (inspection target)
19: Opening/closing cover
19': Cover
19B: Robot handle (handle)
20: Automated analysis support robot
21: Vehicle body
22: Camera
23: Manipulator
23a: Hand
30: Computer (computer, first computer)
40: Communication device (communication device, communication module)
50: Console (second computer, communication device)
Y: Work area

The invention claimed is:

1. An automated analysis support robot configured to perform an inspection of an analysis module that automatically analyzes a biological sample, comprising:
a vehicle body;
a camera mounted to the vehicle body;
a communication device that directly or indirectly communicates with the analysis module;
a computer that controls the vehicle body and the camera, wherein the computer:
stores an analysis cycle time of the analysis module in a memory;

controls the vehicle body to move to a predetermined work area and face an inspection target included in the analysis module;

takes a moving image of the inspection target in a time period of a predetermined number of cycles based on the analysis cycle time with the camera; and processes each of a plurality of still images of the inspection target constituting the moving image to compute management data relating to the inspection target, and acquires data on a temporal change of the management data; and a manipulator with a hand put on a handle of an opening/closing cover of the analysis module, the opening/closing cover covering the inspection target, wherein the computer, before facing the inspection target;

controls the vehicle body to move to the work area;

controls the manipulator to put the hand on the handle; and controls the vehicle body to travel along an opening/closing trajectory of the opening/closing cover in a state where the hand is put on the handle and opens the opening/closing cover.

2. The automated analysis support robot according to claim 1, wherein the computer transmits the management data to the analysis module via the communication device.

3. The automated analysis support robot according to claim 1, wherein the management data is an actual remaining amount of a detergent in a detergent container included in the analysis module.

4. The automated analysis support robot according to claim 1, wherein the management data is an indicated value of a pressure gauge included in the analysis module.

5. An automated analysis system comprising:

an analysis module that automatically analyzes a biological sample;

an automated analysis support robot that performs an inspection of the analysis module;

a computer that controls the automated analysis support robot; and a communication device that directly or indirectly communicates with the analysis module, wherein the automated analysis support robot includes:
a vehicle body; and
a camera mounted to the vehicle body, the computer:

stores an analysis cycle time of the analysis module in a memory;

controls the vehicle body to cause the automated analysis support robot to move to a predetermined work area and face an inspection target included in the analysis module;

takes a moving image of the inspection target in a time period of a predetermined number of cycles based on the analysis cycle time with the camera; and processes each of a plurality of still images of the inspection target constituting the moving image to compute management data relating to the inspection target, and acquires data on a temporal change of the management data;

the analysis module includes an opening/closing cover that covers the inspection target, the automated analysis support robot includes a manipulator with a hand put on a handle of the opening/closing cover, and the computer, before facing the inspection target;

controls the vehicle body to move the automated analysis support robot to the work area;

controls the manipulator to put the hand on the handle; and controls the vehicle body to travel along an opening/closing trajectory of the opening/closing cover in a state where the hand is put on the handle, and opens the opening/closing cover.

6. The automated analysis system according to claim 5, wherein the analysis module includes a cover that covers the inspection target, and the cover is at least partially transparent to make the inspection target visually perceivable.

7. The automated analysis system according to claim 5, wherein the computer and the communication device are mounted to the automated analysis support robot.

8. The automated analysis system according to claim 5, wherein the computer includes a first computer mounted to the automated analysis support robot and a second computer disposed separately from the analysis module and the automated analysis support robot, the automated analysis support robot includes a communication module that communicates with the second computer, the first computer photographs the inspection target with the camera corresponding to a command from the second computer, and transmits the moving image of the inspection target to the second computer via the communication module, and the second computer processes the moving image of the inspection target to compute management data on the inspection target.

* * * * *